(12) United States Patent
Handler

(10) Patent No.: US 9,276,747 B2
(45) Date of Patent: Mar. 1, 2016

(54) REMOTE PROFILE SECURITY SYSTEM

(75) Inventor: Bradley A. Handler, Palo Alto, CA (US)

(73) Assignee: Technology Policy Associates, LLC, Palo Alto, CA (US)

( * ) Notice: Subject to any disclaimer, the term of this patent is extended or adjusted under 35 U.S.C. 154(b) by 1320 days.

(21) Appl. No.: 12/185,757

(22) Filed: Aug. 4, 2008

(65) Prior Publication Data

US 2010/0031335 A1 Feb. 4, 2010

(51) Int. Cl.
*H04L 29/06* (2006.01)
*H04L 9/32* (2006.01)

(52) U.S. Cl.
CPC ........... *H04L 9/3226* (2013.01); *H04L 2209/56* (2013.01)

(58) Field of Classification Search
USPC .......... 726/1–6, 18–19, 27–30; 709/206–207, 709/217, 219, 225, 227; 705/76; 713/150, 713/165, 171, 182; 707/703, 758, 784, 707/821–822; 380/228, 231, 255, 277
See application file for complete search history.

(56) References Cited

U.S. PATENT DOCUMENTS

| | | | |
|---|---|---|---|
| 6,154,844 A | 11/2000 | Touboul et al. | |
| 6,484,263 B1 | 11/2002 | Liu | |
| 6,978,373 B1 | 12/2005 | Hild et al. | |
| 7,254,606 B2 * | 8/2007 | Hamada | 709/203 |
| 7,266,595 B1 | 9/2007 | Black et al. | |
| 7,296,151 B2 | 11/2007 | Artobello et al. | |
| 7,543,740 B2 * | 6/2009 | Greene et al. | 235/380 |
| 7,793,109 B2 * | 9/2010 | Ortiz | 713/186 |
| 8,291,490 B1 * | 10/2012 | Ahmed et al. | 726/17 |
| 2003/0051171 A1 | 3/2003 | Pearson | |

(Continued)

FOREIGN PATENT DOCUMENTS

WO WO-2007120549 A2 10/2007

OTHER PUBLICATIONS

"Privacy Policy", Ask.com, [online]. Retrieved from the Internet: <URL: http://about.ask.com/privacy-policy/>, (Dec. 18, 2013), 5 pgs, Notice Regarding Ask Eraser Please note that Ask will discontinue its AskEraser feature on Jan. 15, 2014. AskEraser is a privacy feature from Ask that when enabled, deletes your search activity from Ask's servers in most circumstances. However, even without Ask Eraser, you can use your browser's support or help settings to disable Ask cookies from collecting this information in the first place. Detailed information about how to disable Ask.com cookies can be found below.
Spidle, Jason, "How to Pause Google Search History", eHow, [online]. Retrieved from the Internet: <URL: http://www.ehow.com/how_8458278_pause-google-search-history.html>, (Accessed on Jul. 23, 2014), 3 pgs.

*Primary Examiner* — Joseph P Hirl
*Assistant Examiner* — Leynna Truvan
(74) *Attorney, Agent, or Firm* — Schwegman Lundberg & Woessner, P.A.

(57) ABSTRACT

A method comprises storing, at the server computer system, user profile information for the remote user. The user profile information for the remote user (or a link to the user profile information) is encrypted using authentication information. The user profile information is associated with user identification information, at the server computer system, using the authentication information, which is selectively made available by the remote user via the network to the server computer system in order to enable the server computer system to associate the user profile information with the user identification information.

33 Claims, 10 Drawing Sheets

(56) References Cited

U.S. PATENT DOCUMENTS

| | | |
|---|---|---|
| 2005/0033803 A1 | 2/2005 | Vleet et al. |
| 2005/0154921 A1 | 7/2005 | Medvinsky |
| 2007/0186099 A1 | 8/2007 | Beck et al. |
| 2007/0261116 A1 | 11/2007 | Prafullchandra et al. |

* cited by examiner

REMOTE PROFILE SECURITY SYSTEM

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2008, Technology Policy Associates, LLC, All Rights Reserved.

BACKGROUND

User profile information is becoming an increasingly important asset to service providers, as they seek to provide highly customized and personalized experiences to service consumers. This is particularly true for software vendors and software service providers. For example, there are many providers of software-based services (e.g., website operators) that customize user interactions, as well as the presentation of information (e.g., content and advertisement), based on user profiles during interaction sessions with software supporting a particular service. Accordingly, from a software or software-services vendor perspective, the ability to obtain, generate and access user profile information is highly desirable.

From a user perspective, while the customization of software and services may be beneficial, privacy and security concerns cannot be ignored. Privacy concerns exist both with respect to the creation of user profile information by a vendor and the use of such profile information. For example, when interacting with a particular software application (e.g., when using a commercial search engine to search or when shopping on an e-commerce website), a user may or may not wish to have their activity for that particular session recorded and used to update a profile. Consider the situation in which the user is a middle-aged man, but is shopping for a gift for his teenage niece. In this situation, the user may not wish to have his activities used to automatically supplement his user profile that is automatically generated and maintained by the website. On the other hand, when shopping for technology gadgets, this particular user may view his activities with respect to that interaction as being relevant to his profile. Accordingly, the user may wish to have his profile accessed during such a session so that the software can accurately recommend products.

Turning to search software-based service providers, commercial search systems may save a search history only for a single session, or provide an option for registered users to save searches. Search history options are typically software-based, and allow searchers to access the history from any Internet-connected computer system by logging into a user account. The search history data (e.g., as part of a user profile) is typically stored on the search engine computers. Again, a user may or may not, for various reasons, wish to have their searching activities for a particular session logged and used to construct or modify a profile that is being automatically created by the search engine computers.

With respect to search history gathering, certain search engines provide no option to pause or turn off search history gathering, although logging out of a session often provides the same effect. Google, on the other hand, does provide a "pause" function that can be used to stop recording of search results without requiring that the user log out.

Ask.com has introduced an AskErase feature, which allows users to immediately delete search queries stored on servers of Ask.com in an attempt to address certain concerns around the privacy of search results history.

United States Patent Application Publication No. US 2005/0033803 describes a website system that includes an event history server system that persistently stores event data reflective of events that occurred during a browsing session of website's users, and makes such data available to other applications and services in real time. Various types of events and information are recorded by the event history server system, and event data is stored by user identifier (ID). These types of personalization applications and features are made possible by an event history server. An event search engine is provided through which users can search the respective event histories by event type, event value and event time-all-occurrence, and various other criteria. Users may also be permitted to "delete" specific events from their respective event histories.

United States Patent Application Publication No. US 2003/0051171 describes a user apparatus that forms a user identity, such as in a trusted platform module, and also captures at least one profile characteristic in a capture unit. An inquiring apparatus sends the request to the user apparatus. A profile unit forms a user self-profile by combining a formed user identity with one or more selective profile characteristics of interest to the inquirer. The user profile is formed at the user apparatus, and sent to a remote inquiring apparatus. The user therefore maintains some control of his/her user profile, and an overhead, such as data storage on an inquiring apparatus, is decreased. Paragraph [077] of this application discusses how a user identity supplied in a user self-profile may be checked.

United States Patent Application Publication No. US 2007/0261116 describes a secure content service available through a network. A user profile is stored in a user profile store, and the user access controller enforces access rights to the user profile. The user profile, once accessed, may be used to provide access to other content. A user profile store stores user profiles, each of which has a unique identifier. The user may set access levels to his or her profile in a profile store. A profile access controller enables a user to set access granularity and preferences. A user interface (275) enables access to the user profile through the profile access controller. Monitoring and logging logic (280) monitors access to the system, including user profile accesses and user preferences set by the user. The monitoring and logging logic determines if an access to a user profile is anomalous.

The described system is concerned with controlling access to the content which a content creator submits for a publication. A determination is made whether a content consumer is identified (i.e. has an associated user profile and is connected to the user profile), and whether the content consumer has access permissions to the content. The process may also determine whether content needs a content consumer's filter specifications. If there are no filters associated with content, or the content needs the filter specifications, data is decrypted and displayed to a content consumer.

BRIEF DESCRIPTION OF DRAWINGS

Some embodiments are illustrated by way of example and not limitation in the figures of the accompanying drawings in which.

DETAILED DESCRIPTION

Figure 1:
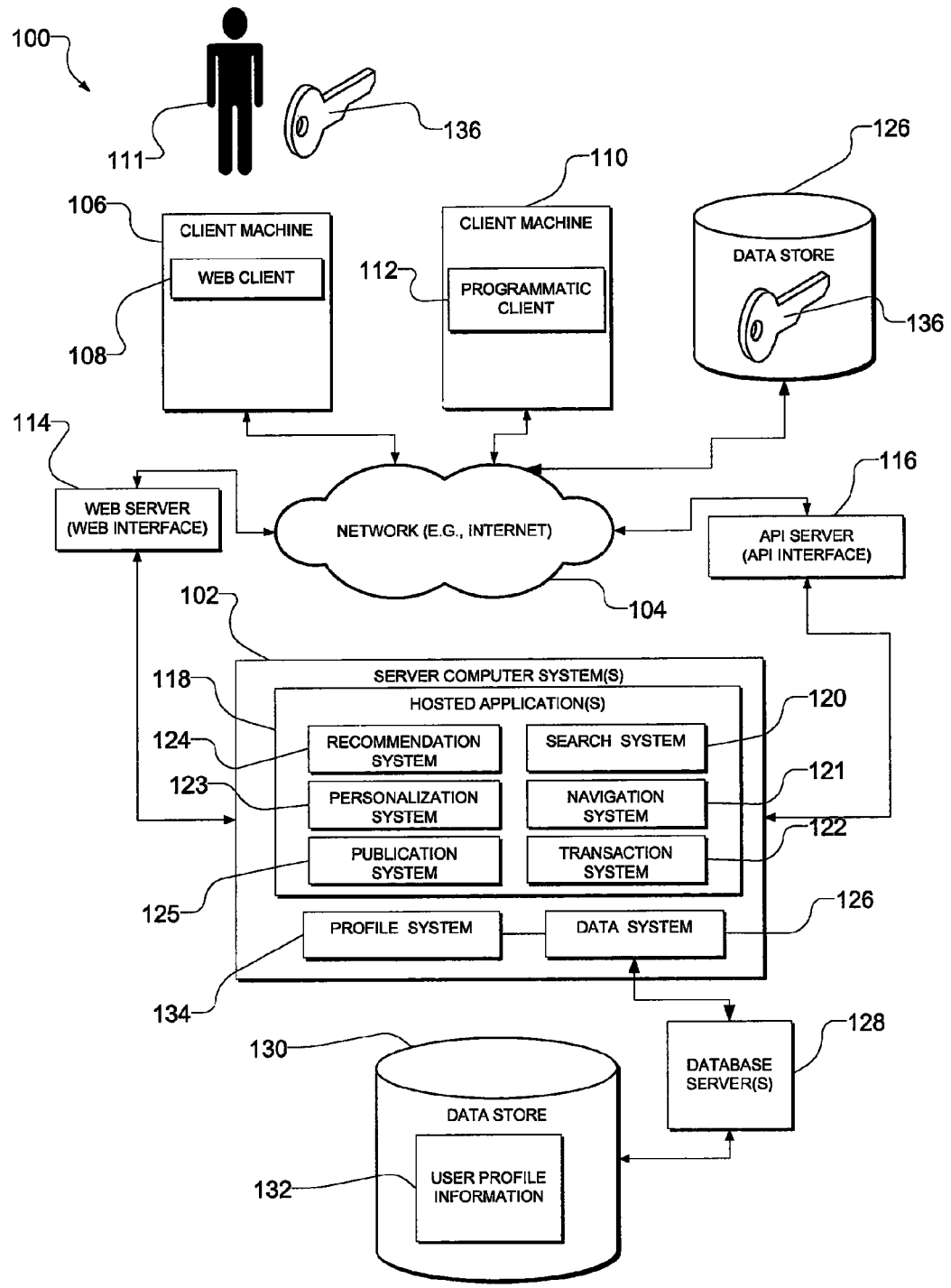
FIG. 1 is a block diagram illustrating a system, according to an example embodiment, to provide a remote profile security, within the context of a network computer system.

In the following description, for purposes of explanation, numerous specific details are set forth in order to provide a thorough understanding of some example embodiments. It will be evident, however, to one skilled in the art that the present invention may be practiced without these specific details.

Example systems and methods described herein are directed to the creation and maintenance of user profile information at a server computer system, the user profile information pertaining to a remote user that accesses the server computer system via a network using a client computer system. The generation and maintenance of the user profile information is performed, at least in part, by the server computer system (e.g., by a profile system forming part of the server computer system) based on interactions by the remote user with the server computer system. In one example embodiment, a user profile that is accessible to the server computer system comprises machine-generated user profile information that is automatically generated and maintained by the computer system based on the interactions by the remote user with the server computer system (e.g., an application hosted by the server computer system). The user profile for the remote user may also include user-provided profile information, which is provided by the remote user to the server computer system. Examples of this second user-provided profile information include bibliographic contact as well as financial and demographic information that may be volunteered by the remote user, and that is not necessarily automatically inferred and generated from user activities and interactions with the server computer system.

The example user profile may also include first and second user profile information having different access restrictions (e.g., restricted user profile information and unrestricted user profile information). Different access restrictions may be specified by the remote user or by the server computer system with respect to the first and second user profile information.

Considering restricted user profile information, for example, this information may be stored at the server computer system in an encrypted form. In one embodiment, the restricted user profile information is encrypted utilizing authorization information (e.g., a key), and thereafter stored at the server computer system. In another embodiment, the restricted user profile information may first be stored, whereafter access restrictions may be applied thereto, subsequent to storage.

The restricted user profile information is then accessed at the server computer system using the authorization information, the authorization information having selectively been made available by the remote user, via the network to the server computer system, in order to enable the server computer system to access the restricted user profile information.

In an example embodiment, the authorization information is received from the remote user at the server computer system, and is temporarily stored at the server computer system to enable the access to the restricted user profile information. The authorization information (e.g., the key) may thereafter be expunged or removed from the server computer system, subsequent to the access of the restricted user profile information. In one embodiment, the authorization information is expunged or removed from the server computer system subsequent to a determinable interaction (e.g., a web-based interaction session) by the remote user with the server computer system, or after a determinable time.

It should be noted that the authorization information may be removed or expunged from the server computer system subsequent to an access to the user profile information either for the purposes of storing (e.g., writing) the restricted user profile information or retrieving (e.g., reading) of the restricted user profile information. In various embodiments, the restricted user profile information may accordingly be decrypted, for the duration of a determinable interaction or time period authorized by the remote user, so as to enable access. Thereafter, the restricted user profile information is again encrypted and the authentication information then removed or expunged from the server computer system.

In one example embodiment, the authorization information is received from the remote user at the server computer system via the network as a network communication from the remote user. The authorization information is temporarily stored at the server computer system so as to enable a hosted application of the server computer system to access the restricted user profile information.

In another embodiment, the authorization information is stored at a location accessible by the server computer system (e.g., at a remote data store accessible via a network, such as the Internet). In this embodiment, the receiving from the remote user of the authorization information may include receiving authorization, via the network and from the remote user, for the server computer system to access the authorization information at the accessible location.

The receiving of the authorization information may include receiving a username/password pair, a key (e.g., a symmetrical or asymmetrical key), a personal identification number (PIN), or biometric information some other credential from the remote user. In the example embodiment, the remote profile security system may implement authentication, authorization and audit measures in order to support access restrictions with respect to the restricted profile information. Access restrictions may be implemented by encryption of protected data itself, or by encryption of association data that allows protected data to be associated with entity identification information. By selectively enabling the association and disassociation of protected data (e.g., user profile data) with entity identification information, the ability of a third-party to use the protected data in any meaningful way with respect to the entity is controlled.

Accessing of the user profile by the server computer system may include generating, updating, modifying or retrieving the information from the user profile. In one embodiment, the user profile is updated using remote user activity determined or observed during the interaction session by the remote user with the server computer system.

In one embodiment, the accessing of the user profile information may include using the user profile information to customize an interaction of the remote user with a hosted application of the server computer system.

The accessing of the user profile may also occur on an interaction session-by-session basis responsive to the provision of the authorization information to, or the withholding of the authorization information from, the server computer system by the remote user.

FIG. 1 is a block diagram depicting a client-server computer system 100, within which an example embodiment may be deployed. A server computer system 102, which may host any number or type of hosted applications and subsystems, provides server side functionality, via a network 104 (e.g., the Internet or a Wide Area Network (WAN)) to one or more client computer systems. For example, a first client computer system 106 hosts a web client 108 (e.g. a browser such as the INTERNET EXPLORER browser developed by MICROSOFT CORPORATION, Redmond, Wash. State), while a second client computer system 110 hosts a programmatic client 112 that is capable of programmatic access to the server computer system 102. The web client 108 and the programmatic client 112, in example embodiments, enable a remote user 111 to interact with applications and systems of the server computer system 102. To this end, a web server 114 and an Application Program Interface (API) server 116 are coupled and provide programmatic and web interfaces, respectively, to the server computer system 102.

The server computer system 102 hosts any number of hosted applications 118, which may provide subsystems of the server computer system (e.g., search, navigation, transactions, recommendation, personalization and publication systems 120-125, for example). The server computer system 102 may also include a data system 126 that interacts with one or more data servers 128 to access a data store 130.

The server computer system 102, in an example embodiment, also includes a profile system 134 that is responsible, as will be described in further detail, for the generation, maintenance and updating of the user profile information 132. The profile system 134 may be coupled to receive information from the systems 120-125 in order to machine-generate user profile information. The profile system 134 is also coupled to the data system so as to enable the profile system 134 to write machine of generated profile information to the data store 130 via the database servers 128.

The systems 120-125 may also access the user profile information 132, via the data system 126, in order to use the user profile information 132 for customization, advertisement, recommendation and other system specific purposes. However, for any of the systems of the server host computer system 102 to access at least certain portions of the user profile information 132, according to example embodiment, authorization information in example form of a key 136 may be required by the data system 126. The remote user 111 may selectively provide the key 136 to the server computer system 102 in order to facilitate access to the user profile information 132 by subsystems of the server computer system 102.

Figure 2:
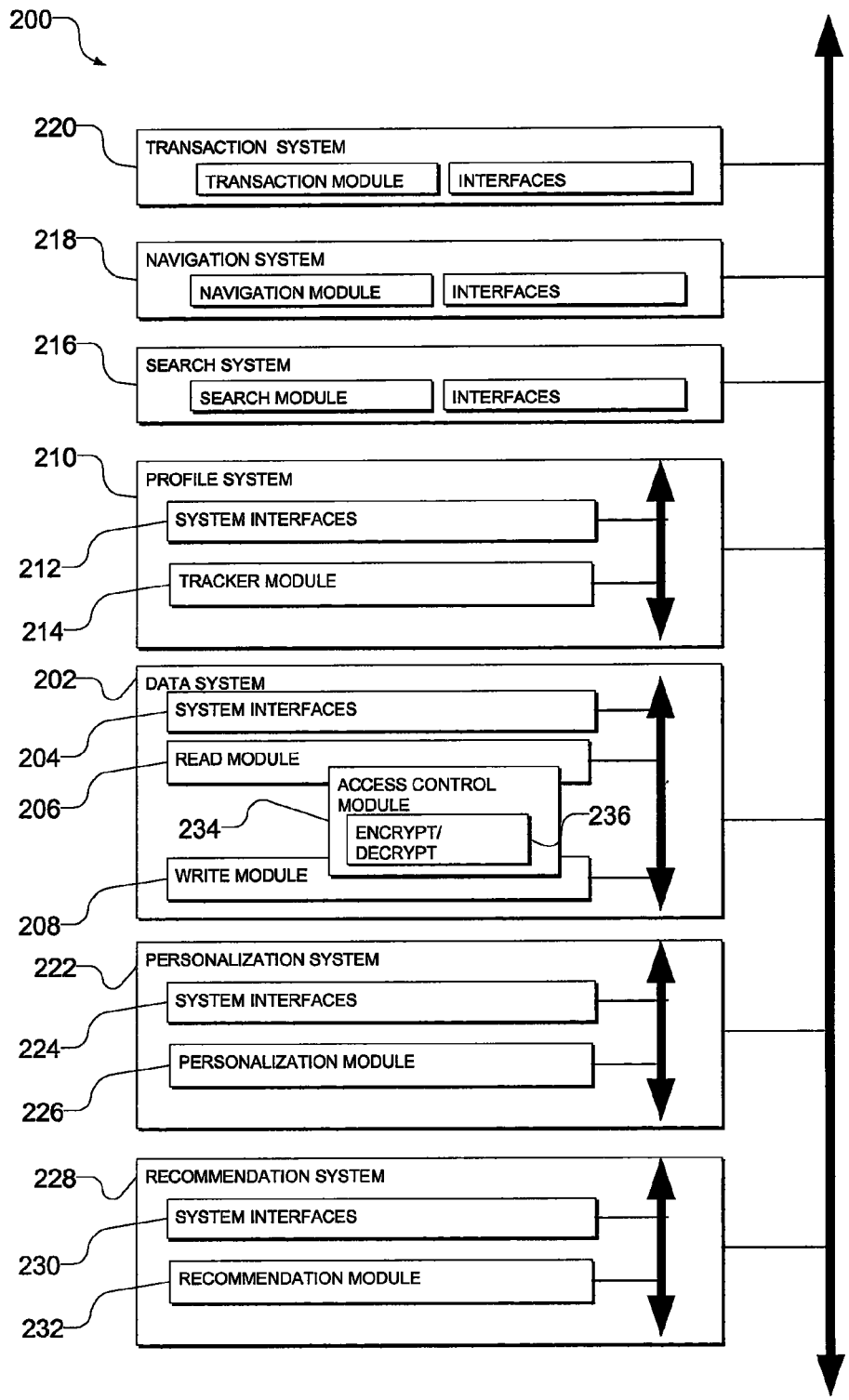
FIG. 2 is a block diagram illustrating architecture of a remote profile security system, according to an example embodiment.

FIG. 2 is a block diagram illustrating various subsystems, according to an example embodiment, which may be included within the server computer system 102. Certain of these subsystems may be implemented as hosted applications executing on the server computer system 102.

FIG. 2 is a block diagram illustrating architectural details of a server computer system 200, according to an example embodiment, which may correspond to the server computer system 102 of FIG. 1. The server computer system 200 is shown to include a number of subsystems, which may be implemented as modules, components or units and may be partially implemented in software (e.g., as applications). A data system 202 is shown to include one or more system interfaces 204 by which components of the data system 202 communicate with other systems and components of the server computer system 200. The data system 202 also includes a read module 206 to support read access by the server computer system 200 to the data store 130. A write module 208 similarly supports write accesses by the server computer system 200 to the data store 130.

A profile system 210 interacts with other subsystems of the server computer system 200 to construct machine-generated user profile information based on activities of a user, such as interactions by a user with the server computer system 200. To this end, the profile system 210 includes system interfaces 212, and a tracker module 214 that receives data file, via the interfaces 212, from a search system 216, a navigation system 218 and a transaction system 220, each of which include respective interfaces for communicating with the profile system 210. For example, the search system 216 may communicate search information, together with a user identifier, to the tracker module 214, which uses information to machine-generate search history profile information for the relevant user. Similarly, the navigation system 218 may communicate navigation information (e.g., a click stream information), together with a remote user identifier, to the tracker module 214, which uses this information to create a navigation history profile information. The transaction system 220 may likewise communicate transaction information (e.g., purchase and payment information) to the tracker module 214, together with a remote user identifier) to enable the tracker module 214 to construct transaction history profile information. The search history, navigation history, and transaction history information are examples of activity data that is fed to the tracker module 214, together with appropriate remote user identifiers, so as to enable the tracker module 214 to machine-generate user profile information.

The tracker module 214, having machine-generated user profile information, communicates this information to the write module 208 of the data system 202, which then proceeds to supplement the user profile information 132 within the data store 130 utilizing the machine-generated user profile information.

Turning now to the read access functionality of the server computer system 200, a personalization system 222 includes interfaces 224 and a personalization module 226 that, via the interfaces 224, may issue read requests to the read module 206 of the data system 202. The data subsystem in turn may selectively retrieve user profile information 132 from the data store 130, and provide this user profile information to the personalization system 222. The personalization system 222 may then interact with any of the systems 216, 218 and 220, for example, to personalize the presentation of information, interaction responses and application flows of the systems.

Similarly, a recommendation system 228 may include interfaces 230 that enable a recommendation module 232 to issue requests for user profile information to the read module

206. Upon receiving such user profile information, the recommendation system may provide recommendations to an advertisement presentation system or product recommendation system (not shown) which may interact with the transaction system 220.

Finally, it will be noted that each of the read and write modules 206 and 208 of the data system 202 are coupled to an access control module 234, which operates to enforce access control with respect to the user profile information 132, and particularly with respect to restricted user profile information. As will be described in further detail below, the access control module 234 may operate to authenticate a remote user, receive authorization information from that remote user to provide access (e.g., via the read and write modules 206 and 208) to the user profile information 132 and, based on the receipt of such authorization information from an authenticated remote user, selectively permit other subsystems of a server computer system to access the user profile information. To this end, the access control module 234 may implement discretionary access control (DAC) in terms of an access policy specified by a remote user to which the user profile information relates. In an example embodiment, the access control module 234 may include an encrypt/decrypt module 236 which is operative to receive the authorization information (e.g., a key) from a remote user, and to decrypt restricted profile information temporarily to permit accesses. Subsequent to an access event, the encrypt/decrypt module 236 may re-encrypt the restricted user profile information or purge the decrypted and restricted user profile information, before purging the received authentication information from the server computer system 200.

Figure 3:
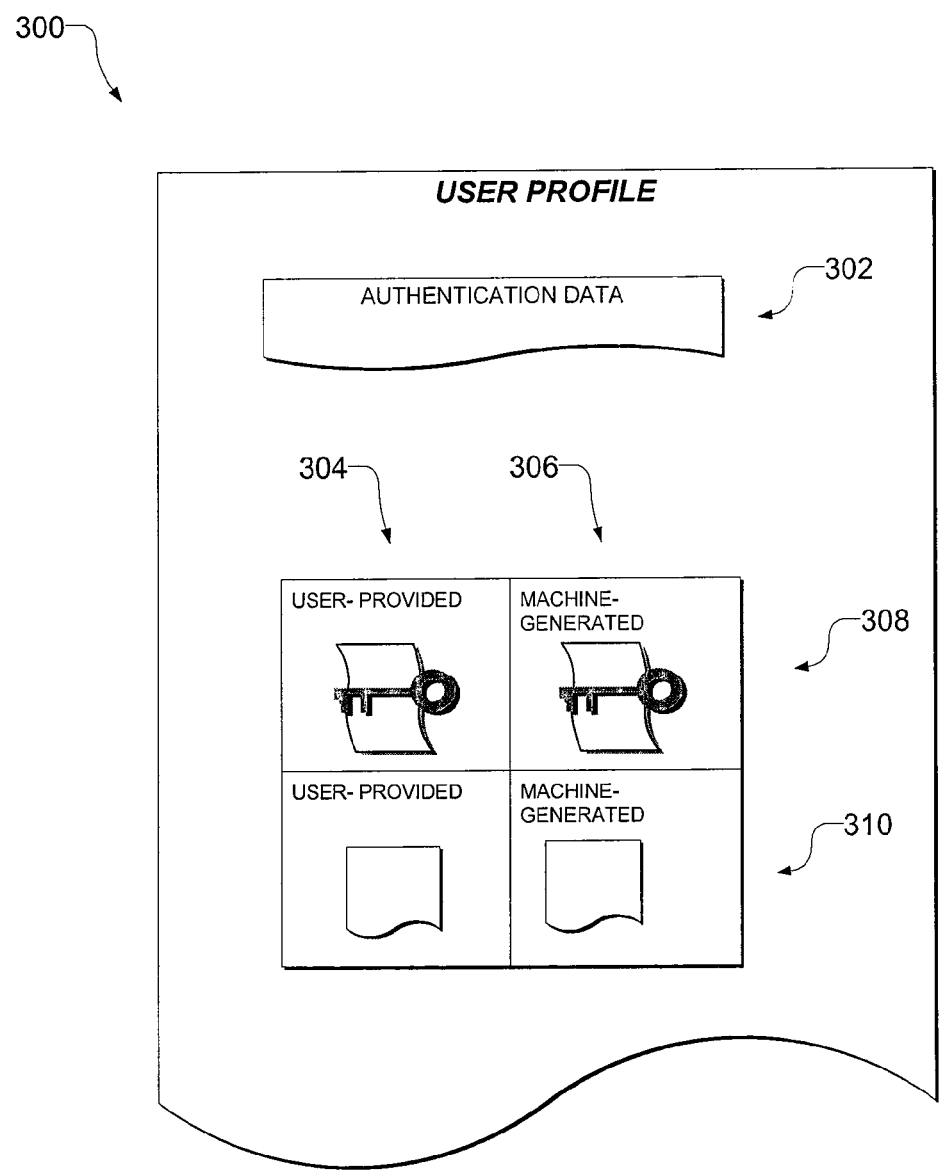
FIG. 3 is a block diagram illustrating a structure for user profile information, according to an example embodiment.

In a further example embodiment, a link or association that facilitates meaningful use of or access to the restricted profile information may selectively be encrypted. The restricted profile information itself may or may not be encrypted and decrypted. The link or association, which may be encrypted and decrypted to control identification of the restricted profile information has been applicable to particular entity (e.g., a user), may be a link between restricted profile information and identification information associated with an entity. In one example embodiment, the link or association may be implemented through an indexing scheme in a relational database. For example, an unrestricted profile or identification information entry (e.g., a name or user identifier) within one table may be linked by an encrypted index to a restricted profile information entry (e.g., bank account details) in a further table. Meaningful access to the restricted profile information may selectively be enabled by decrypting the encrypted index and restricted profile information may thus be associated with a known or identifiable entity. The encrypt/decrypt module 236 may, in one embodiment, receive authorization information from a remote user, and decrypt the index to temporarily permit identification of an entity to which the restricted profile information pertains. Subsequent to the access event, the encrypt/decrypt module 236 may then re-encrypt the index. While access to the restricted profile information in this example embodiment is not prohibited, by encrypting an association or link to an entity identifier, meaningful access to the restricted data is effectively controlled. FIG. 3 is block diagram illustrating a conceptual structuring of user profile information 300, according to an example embodiment. The user profile information 300 may correspond to the user profile information 132 shown in FIG. 1 to be maintained within the data store 130.

The user profile information 300 for each remote user may include system authentication data 302 that is used by the access control module 234 to authenticate a remote user 111 prior to requesting authorization information from that remote user 111. For example, the authentication information 302 may be username/password credentials or some other authentication data to support a well-known authentication scheme.

The user profile information 300 is shown to include user-provided data 304, which is information volunteered or otherwise provided by a remote user 111. Examples of such user-provided data 304 may include name and contact information, financial account information, and certain demographic information. The user profile information 300 also includes machine-generated data 306, which may be generated, for example, by the profile system 210 described above with reference to FIG. 2.

The user profile information 300 may furthermore be classified as being restricted data 308 and unrestricted data 310. The designation of user profile information 300 as being either restricted data or unrestricted data 308, 310 may be manually formed by the remote user 111, or may be mandated by the server computer system 200. According to an example embodiment, the restricted data 308 itself is encrypted, utilizing authorization information (e.g., a key) that is selectively and temporarily provided by the remote user 111 to the server computer system 200. Accordingly, while access to the unrestricted data 310 is not restricted by the access control module 234, access to the restricted data 308 would require the decrypting of the restricted data 308 by the encrypt/decrypt module 236 of the access control module 234.

Figure 4:
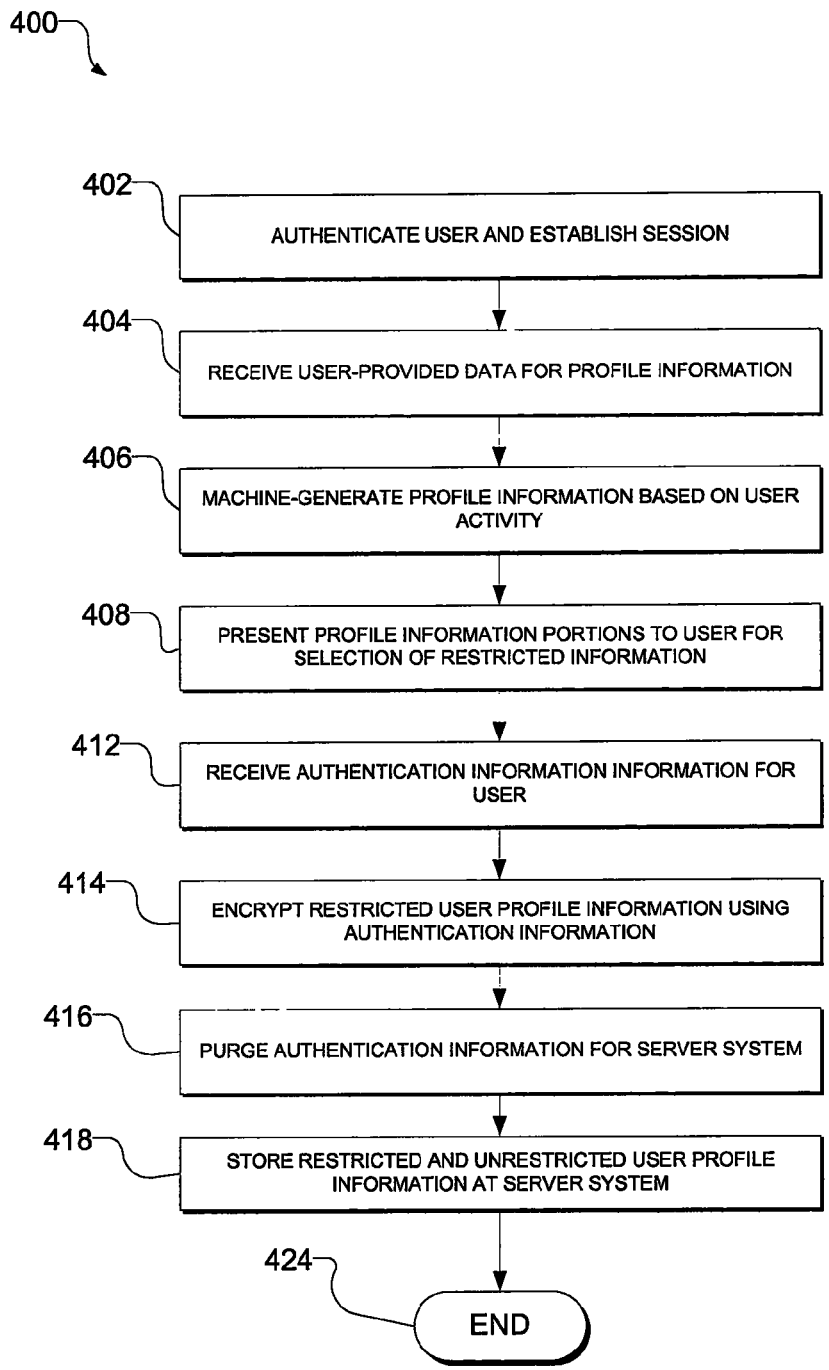
FIG. 4 is a flowchart illustrating a method, according to an example embodiment, to construct user profile information.

Again, in a further example embodiment, a link or association between the restricted data 308 and the unrestricted data 310 may be selectively decrypted by the encrypt/decrypt module 236 of the access control module 234 to facilitate meaningful access to the restricted data 308. FIG. 4 is a flowchart illustrating a method 400, according to an example embodiment, to create the user profile information 300. At operation 402, a remote user 111 accesses the server computer system 200 and is authenticated (e.g., utilizing a username/password to log in to the server computer system), and a connection session is established between a client computer system 106/110 of the remote user 111 and the server computer system 102. In order to enable the tracker module 214 to gather information from the search, navigation, and transaction systems 216, 218 and 220, the tracker module 218 may deposit a session cookie onto the client computer system 106/110, or otherwise maintain state between the client computer system and the server computer system. The authentication operation 402 may be performed, in one example embodiment, by the access control module 234 using the system authentication data 302 which is stored as part of the user profile information 300 for the remote user 111.

At operation 404, the profile system 210 may receive user-provided data 304 to be included within the user profile information 300 for the specific remote user 111. To this end, the remote user 111 may be prompted, for example during a registration process, to provide name, contact, address, date of birth and other topographic and demographic information.

At operation 406, the profile system 210, using the tracker module 214, may generate the machine-generated data 306 for the profile information 300, in the manner described above.

At operation 408, the profile system 210 may then present portions of the user profile information 300 to the remote user 111 (e.g., through an appropriate interface of the web client 108 or the programmatic client 112) so as to enable the remote user to designate or select certain types or portions of the user's profile information 300 as being restricted. In another embodiment, the profile system 210 may automatically recognize certain types of user profile information 300 as being restricted while other portions are, by default, unrestricted. In a further embodiment, policies recognized by the profile system 210 may mandate that certain portions of user profile information 300 be classified as restricted.

At operation 412, the access control module of the data system 202 receives authorization information from the remote user 111. In one embodiment, the remote user 111 may be prompted for such authorization information in the form of a key with which the restricted profile information is to be encrypted. For example, a user interface may be presented to the remote user 111 requesting manual input of an alphanumeric key. In other embodiments, the authorization information may be obtained from a client computer system by issuing a request for a key that is resident on the client computer system or is accessible by the client computer system 106/110. To this end, a remote user 111 may store an authorization key on a portable storage device (e.g., an electronic key fob) that may be read by the client computer system and provided to the access control module. In another example embodiment, the authorization information may be biometric information and the remote user 111 may be requested to provide biometric input (e.g., a fingerprint, retinal scan etc) into a biometric access control system.

In a further embodiment, the authentication information may be maintained in a remote data store 140, to which the server computer system 102 has access via the network 104. In this embodiment, the user may provide authorization, either directly to the data store 140 or to the server computer system 102, for the access control module 234 to obtain the authentication information stored within the remote data store 140. For example, the user 111 may provide authorization to a controller of the remote data store 140 to temporarily allow access by the server computer system 102 to the data store for a predetermined amount of time or for some other determinable time period.

At operation 414, the encrypt/decrypt module 236 proceeds to encrypt the restricted data 308 of the user profile information using the authentication information (e.g., a key) received at operation 412.

At operation 416, having encrypted the restricted data 308, the access control module 234 purges the authentication information from the server computer system 200.

At operation 418, the write module 208 proceeds to store both the restricted data 308 and the unrestricted data 310 of the user profile information 300 for the remote user 111 in the data store 130.

It will be appreciated that, as the restricted data 308 is encrypted utilizing authentication information (e.g., a key) that is no longer accessible or stored at the server computer system, any security breaches at the server computer system while the restricted data 308 remains encrypted will not expose the restricted data to access threats. Similarly, in the event that a third party, either legally and with permission of an operator of the server computer system, or maliciously and without such permission, gains access to the user profile information, the restricted data 308 included in the user profile information 300 would be inaccessible to such a third party absent the authentication information controlled by the remote user 111. In this way, the remote user 111 is provided with assurances that his or her profile data, which is stored, maintained and generated at the server computer system, is firmly under his or her control, and unauthorized access to this data, while in encrypted state, will be difficult absent his or her cooperation. The method 400 then ends at operation 424.

Figure 5:
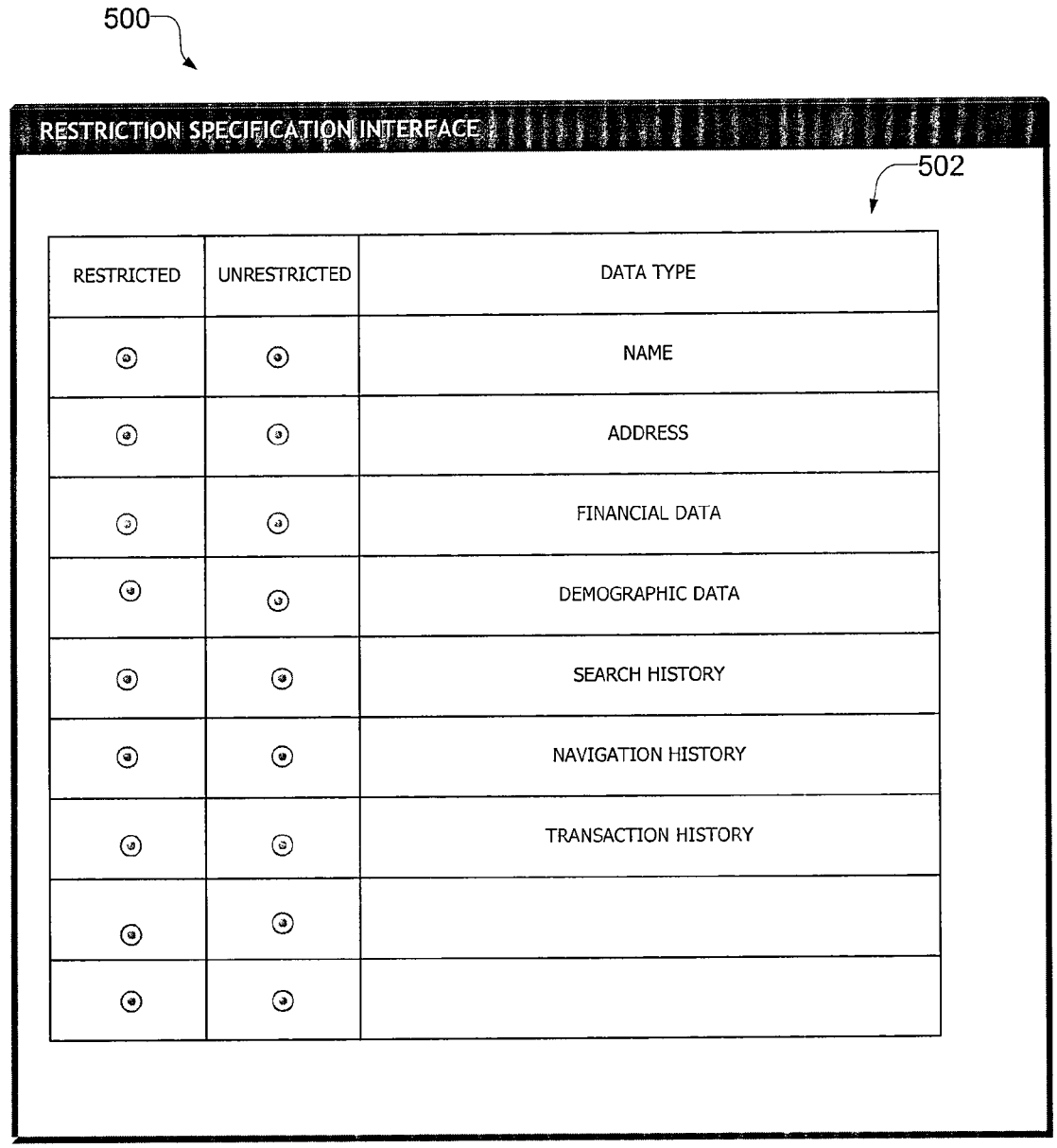
FIG. 5 is a user interface diagram illustrating a user interface, according to an example embodiment, to receive restriction specifications with respect to user profile information.

FIG. 5 is a user interface diagram illustrating a user interface 500, according to an example embodiment, that may be presented to a user at operation 408 so as to enable a user to designate certain portions of his/her profile information 300 as restricted or unrestricted. As shown, the user interface 500 identifies various types 502 of user profile information 300, along with associated radio buttons that allow a user to specify each type 502 of the user profile information as being restricted or unrestricted.

Figure 6:
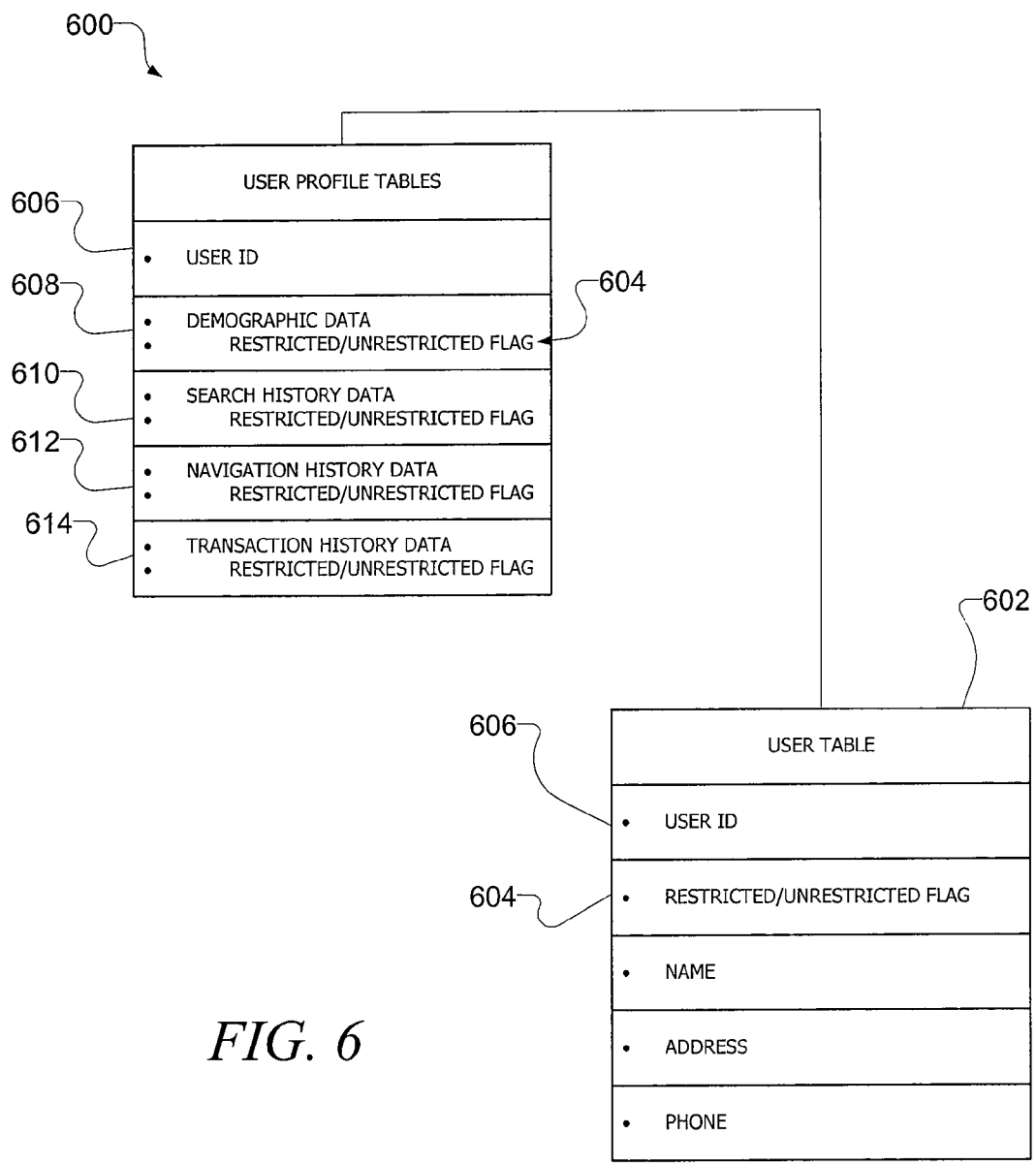
FIG. 6 is an entity relationship diagram illustrating various tables that may be maintained within the data store in order to store the user profile information.

FIG. 6 is an entity relationship diagram illustrating various tables 600 that may be maintained within the data store 130 in order to store the user profile information 300. The tables 600 include a master user table 602 which stores a name, address and contact information for a particular user, as well as an indication (e.g., a restricted identifier 604) as to whether the information for a particular user within the user table 602 is restricted or not. As described above, if the name, address and contact information for a particular user is designated as restricted, this information may be stored in an encrypted state within the user table 600. The user table 602 is indexed, via a user identifier 606, to any number of further user profile tables that may include, for example, a demographic data table 608, a search history table 610, a navigation history table 612 and a transaction history table 614. In addition to including a user identifier 606, each record within each of the tables 608-614 also includes a restricted identifier 604 which designates a particular record for a specific remote user 111 as being restricted or unrestricted, and is accordingly stored in an encrypted or unencrypted state.

In a further example embodiment, an index within a particular table may be encrypted so as to restrict association with further data. For example, in one example embodiment, the user identifier 606 may be selectively encrypted and decrypted so as the control association of particular user identification data (e.g., name, address and phone number) with particular user profile information (e.g., information 608-614). The index in either the table 602 or the table 600 may be encrypted so as to control the association of the information within the various tables. In one example embodiment, user profile information may be the divided between a restricted user profile table and an unrestricted user profile table, with an index (e.g., the user identifier 606) in the restricted user profile table being selectively encrypted and decrypted to control association of the restricted user profile information with the user identification information. An index in the unrestricted user profile table would in this case not be encrypted and accordingly not prevent or restrict the unrestricted user profile information from being associated with the user identification information.

A user of the server computer system 102 may, in an example embodiment, access the restriction specification interface 500 as shown in FIG. 5 at any time following an authentication operation and change the designation of a particular type of user profile information from being unrestricted to restricted, or vice versa. Responsive to any changes in these designations, the encrypt/decrypt module 236 may traverse the tables 600 and appropriately decrypt or decrypt the relevant records. Alternatively, the encrypt/decrypt module 236 may operatively store a particular type of data within a restricted user profile table or an unrestricted user profile table, responsive to and dependent upon a designation by a user.

Figure 7:
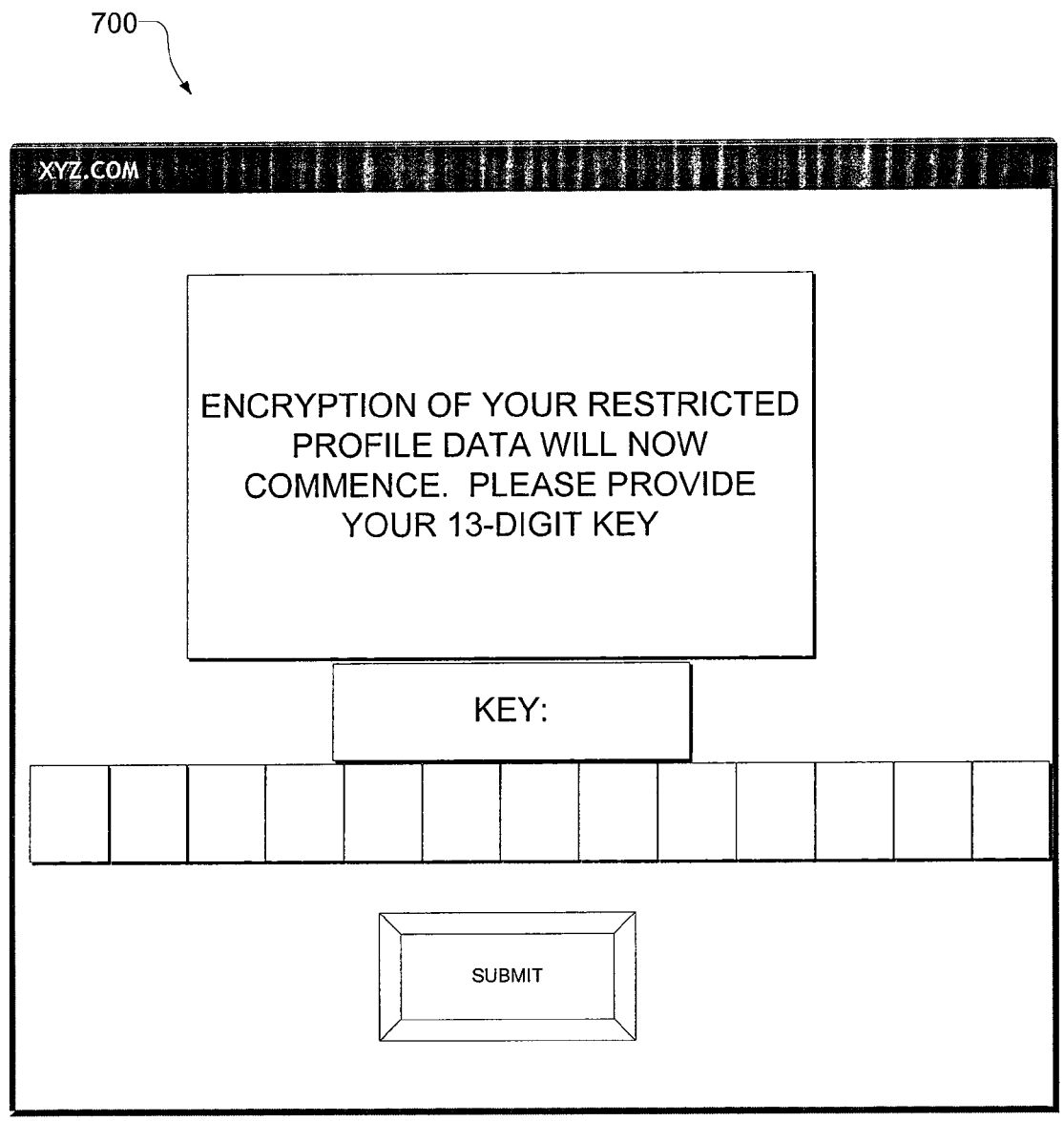
FIG. 7 is a user interface diagram illustrating an example authorization information request interface that may be presented to a user to prompt the user to manually input authentication information.

FIG. 7 is a user interface diagram illustrating an example authorization information request interface 700 that may be presented to a user, at operation 412, to prompt the user to manually input authentication information, in the example form of a 13-digit key.

Figure 8:
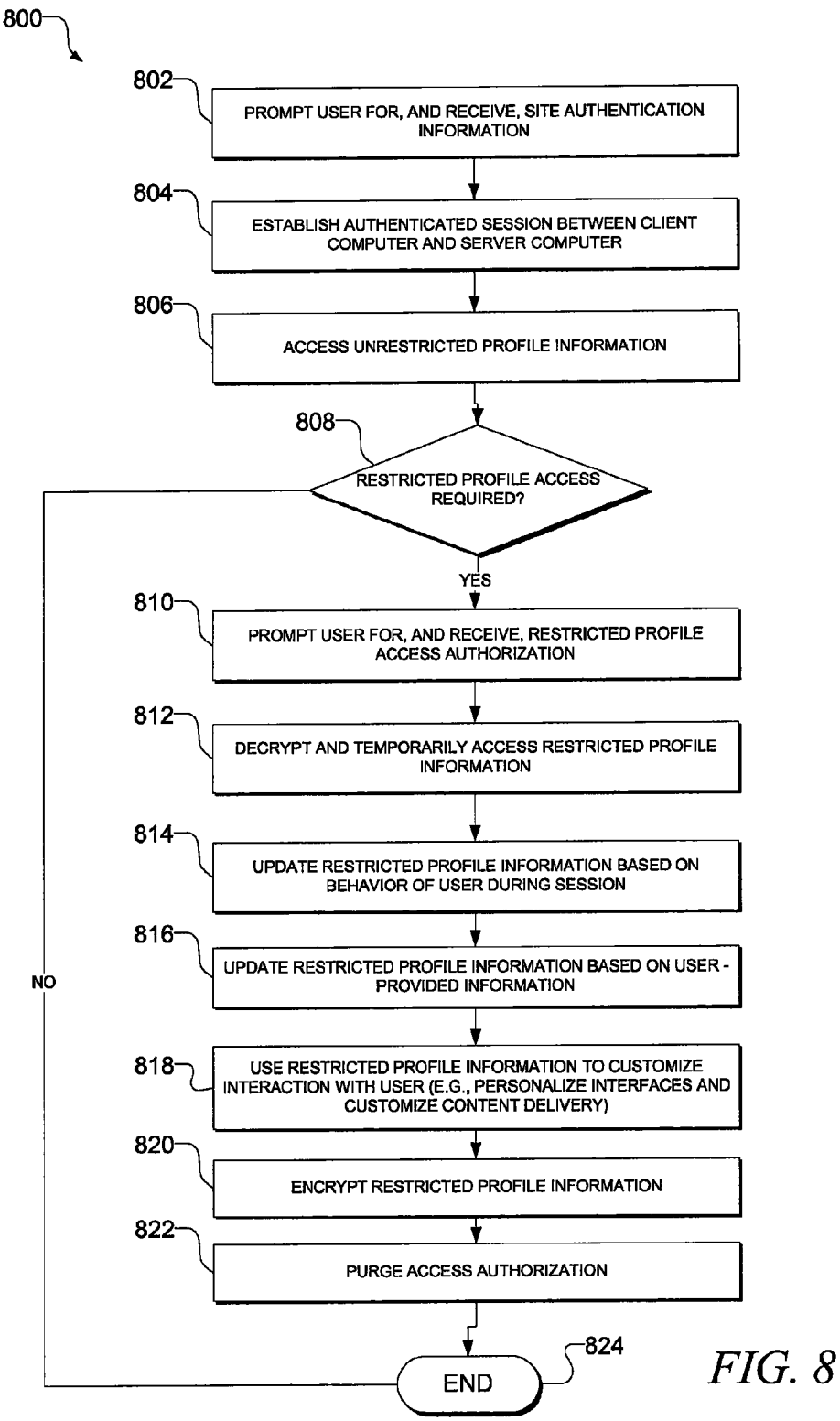
FIG. 8 is a flowchart illustrating a method, according to an example embodiment, to control access to user profile information.

FIG. 8 is a flowchart illustrating a method 800, according to an example embodiment, to control access to user profile information.

The method 800 commences at operation 802 where the user is prompted for, and the server computer system 102 receives, authentication information (e.g., username/password information) that is verified against the system authentication information 302. Responsive to a successful authentication operation, at operation 804, the server computer system 102 establishes an authenticated session with the client computer system 106/110. At operation 806, systems of the server computer system 102 (e.g., the various systems described above with reference to FIG. 2) are provided access to unrestricted data 310 within the user profile information 300.

At decision operation 808, a determination is made as to whether access is required or requested to restricted data 308 of the user profile information 300. This determination may be made responsive to a request received from any of the systems of the server computer system. For example, either the personalization system 222 or the recommendation system 228 may issue a request, via an appropriate system interface, to the read module 206 of the data system 202. The read module 206 will in turn query the access control module 234 for access to the restricted data 308.

If it is determined that access to the restricted data 308 is required, at operation 810, the access control module 234 will prompt the remote user 111 for access authorization information (e.g., a key), which is then received from the client computer system at the server computer system 102. As noted above, the access authorization information may be manually provided by the remote user 111, or may be obtained, with authorization from the remote user 111, from electronic storage associated with the client computer system.

At operation 812, having received the access authorization information, the encrypt/decrypt module 236 proceeds to retrieve the restricted data 308 for the relevant remote user 111, and temporarily decrypt the restricted data 308 using the access authorization information. In one embodiment, the restricted data 308 is decrypted and exposed within the confines of the data system 202, while the version of the restricted data 308 within the data store 130 remains in its encrypted form. Accordingly, the restricted data is only temporarily exposed by the data system 202 for consumption by other systems of the server computer system, and then purged from the data system 202. While the temporarily decrypted restricted data 308 may be made available only for a single access request by other systems, the received access authorization information may be maintained within the encrypt/decrypt module 236 for the duration of a particular session, or for some other determinable time period (e.g., until the occurrence of particular event, such as a logout event or some other determinable event).

Having decrypted the restricted data 308 at operation 812, at operation 814, the restricted data 308 may be updated, for example by the profile system 210, based on activity data received from the systems 216-220 during a particular interaction session, or based on tracked or observed behavior of the remote user 111 during an interaction session with the server computer system. For example, the restricted data 308 may be replaced, supplemented or otherwise modified at operation 814.

At operation 816, the profile system 210 may also update both restricted and unrestricted data 308 and 310 of the user profile information 300 based on user provided data. For example, a user may register new contact details with which the profile information 300 is to be updated.

At operation 818, the user profile information 300, including both decrypted restricted data 308 and unrestricted data 310, may be made available by the data system 202 to any one of the systems (e.g., the personalization system 222 or the recommendation system 228) of the server computer system 102 to facilitate customized and personalized interaction with the remote user 111.

Subsequent to the provision of the decrypted restricted data 308 and the unrestricted information 310, at operation 820, any updated restricted data 308 would then be again encrypted, utilizing the access authorization information, and written back to the data store 130 by the write module 208. In the event that the user profile information 300 has not been updated, at least the decrypted restricted data 308 will be purged or flushed from the server computer system 102 so that this is no longer exposed.

At operation 822, the encrypt/decrypt module 236 then purges the access authorization information from the server computer system 102 so that this is also not accessible and available within the context of the server computer system 102. The method 800 then ends at operation 824.

In this way, the server computer system 102 operates to temporarily expose the restricted data 308 under authorization provided by the remote user 111 for a determinable period of time or until a determinable event, whereafter such exposure is terminated. The user is provided with control to enable and disable access to certain user profile information by selectively providing or withholding access authorization information, which remains available to the server computer system for a determinable time period, or until the occurrence of a determinable event.

In an alternative embodiment, the encrypt/decrypt module 236 may encrypt and decrypt association information associating the restricted data 308 with a further data (e.g., user identification information) that allows of the restricted data to be associated with a particular entity. In this way, meaningful access or use of the restricted data 308 may be controlled.

In one example embodiment, the encryption of the restricted profile information at operation 820 may be performed subsequent to the usage thereof (e.g., at operation 810 to customize an interaction). In another example embodiment, the encryption of the restricted profile information at operation 820 may be performed responsive to detecting logout from a particular as interaction session by the user, or a determinable period of no activity by a remote user with the server computer system 102. To use the example of an online shopping session, where the server computer system 102 hosts a shopping application, a user may selectively provide access authorization to the server computer system 102, and to its hosted shopping application, to enable this profile data to be used to customize a shopping experience during this session. Furthermore, the user may wish his/her activities and behavior during this shopping session to be recorded for the purposes of supplementing and improving user profile maintained for the shopper. However, during a further shopping session, where the user is shopping for an item that is of no interest to him/her, but rather a gift for a third party, the user may avoid recommendations from the server computer system 102 that are irrelevant to current purposes by withholding the access authorization information, and also may avoid his/her profile being updated based on activities or behaviors that would be atypical for the relevant user.

Figure 9:
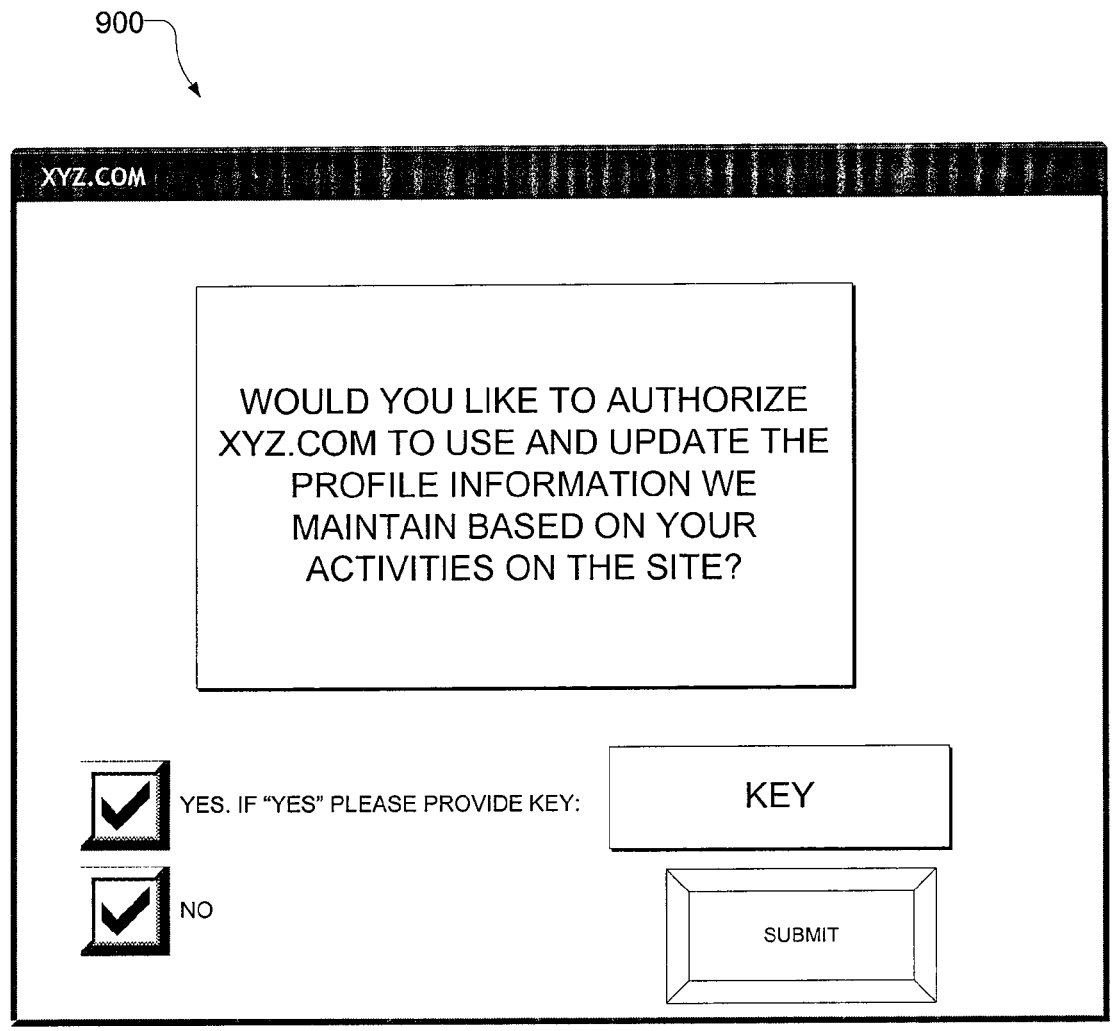
FIG. 9 is a user interface diagram illustrating an access authorization request interface, according to an example embodiment, that may be presented to a user at operation.

FIG. 9 is a user interface diagram illustrating an access authorization request interface 900, according to an example embodiment, that may be presented to a user at operation 810. As shown, the interface 900 advises a user that the server computer system 102 wishes to access restricted profile information, and prompts the user for permission to do so, in conjunction with a request to provide the access authorization information.

Modules, Components and Logic

Certain embodiments are described herein as including logic or a number of components, modules, or mechanisms. A module may be implemented in hardware, firmware, software or any combination of the aforementioned. A component is one embodiment of a module and is a tangible and non-transitory unit capable of performing certain operations and may be configured or arranged in a certain manner. In example embodiments, one or more computer systems (e.g., a standalone, client or server computer system) or one or more subsystems of a computer system (e.g., a processor or a group of processors) may be configured by software (e.g., an application or application portion) as a component that operates to perform certain operations as described herein.

In various embodiments, a component may be implemented mechanically or electronically. For example, a component may comprise dedicated circuitry or logic that is permanently configured (e.g., as a special-purpose processor) to perform certain operations. A component may also comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry or in temporarily configured circuitry (e.g., configured by software), may be driven by cost and time considerations.

Accordingly, the term "component" should be understood to encompass a tangible and non-transitory entity, be that an entity that is physically constructed, permanently configured (e.g., hardwired) or temporarily configured (e.g., programmed), to operate in a certain manner and/or to perform certain operations described herein. Considering embodiments in which components are temporarily configured (e.g., programmed), each of the components need not be configured or instantiated at any one instance in time. For example, where the components comprise a general-purpose processor configured using software, the general-purpose processor may be configured as respective different components at different times. Software may accordingly configure a processor, for example, to constitute a particular component at one instance of time and to constitute a different component at a different instance of time.

Components can provide information to, and receive information from, other components. Accordingly, the described components may be regarded as being communicatively coupled. Where multiples of such components exist contemporaneously, communications may be achieved through signal transmission (e.g., over appropriate circuits and buses) that connect the components. In embodiments in which multiple components are configured or instantiated at different times, communications between such components may be achieved, for example, through the storage and retrieval of information in memory structures to which the multiple components have access. For example, one component may perform an operation, and store the output of that operation in a memory device to which it is communicatively coupled. A further component may then, at a later time, access the memory device to retrieve and process the stored output. Components may also initiate communications with input or output devices, and can operate on a resource (e.g., a collection of information).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA (field programmable gate array) or an ASIC (application-specific integrated circuit).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware, may be a design choice. Below are set out hardware (e.g., machine) and software architectures that may be deployed, in various example embodiments.

Example Machine Architecture and Machine-Readable Medium

Figure 10:
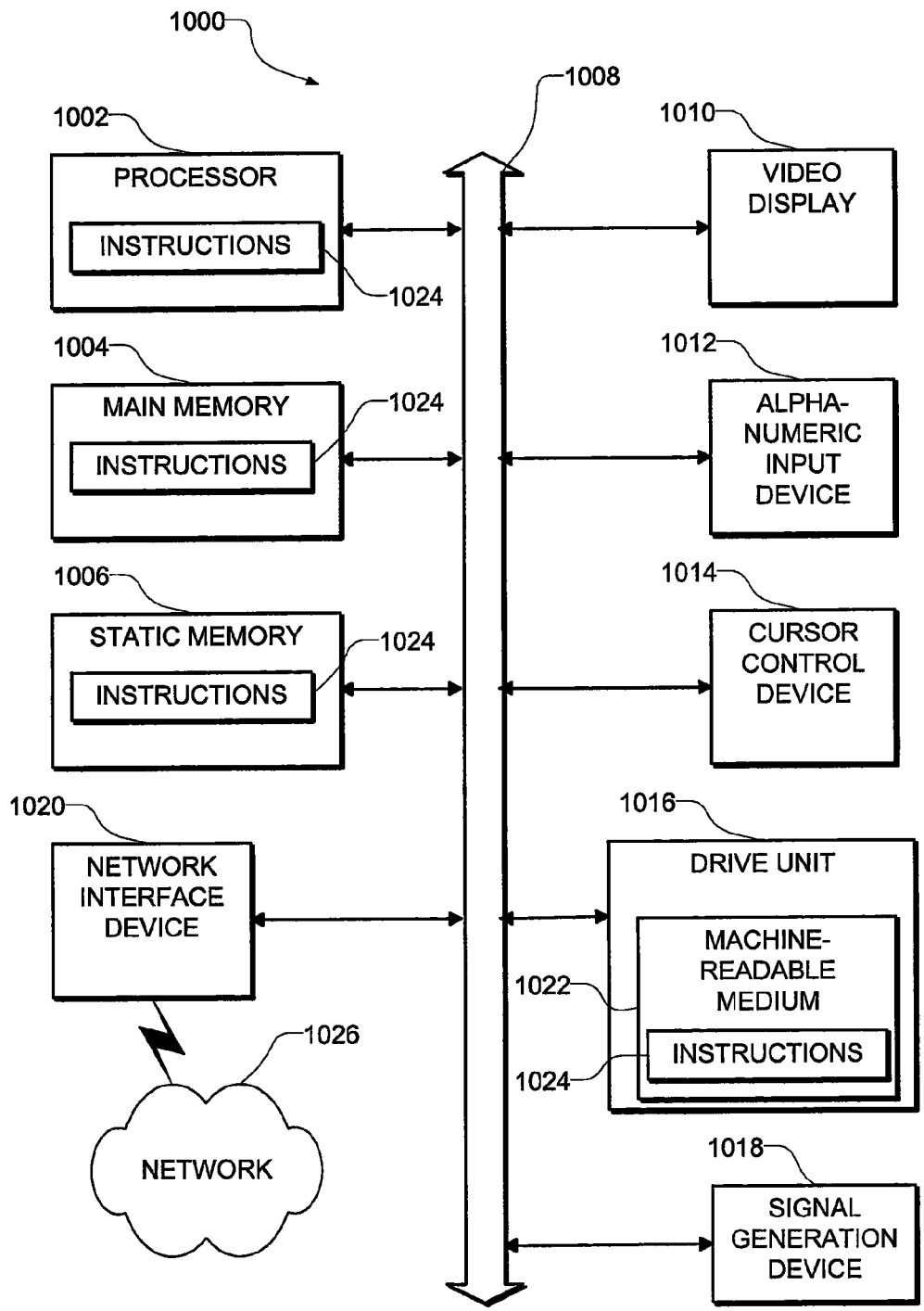
FIG. 10 is a block diagram illustrating a machine, in the example form of a computer system, within which a set of instructions for causing the machine to perform anyone or more of the methodologies discussed herein, may be executed.

FIG. 10 is a block diagram of machine in the example form of a computer system 1000 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a disk drive unit 1016, a signal generation device 1018 (e.g., a speaker) and a network interface device 1020.

Machine-Readable Medium

The disk drive unit 1016 includes a machine-readable medium 1022 on which is stored one or more sets of instructions and data structures (e.g., software 1024) embodying or used by any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

Transmission Medium

The software 1024 may further be transmitted or received over a communications network 1026 using a transmission medium. The software 1024 may be transmitted using the network interface device 1020 and any one of a number of well-known transfer protocols (e.g., HTTP). Examples of communication networks include a local area network ("LAN"), a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible medium to facilitate communication of such software.

Example Three-Tier Software Architecture

In some embodiments, the described methods may be implemented using a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier, and/or to a backend or storage tier. The processing performed by the logic tier may relate to certain rules or processes that govern the software as a whole. A third storage tier may be a persistent storage medium, or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology or a variety of technologies. The example three-tier architecture, and the technologies through which it is implemented, may be realized on one or more computer systems operating, for example, as a standalone system, or organized in a server-client, peer-to-peer, distributed or some other suitable configuration. Further, these three tiers may be distributed between more than one computer systems as various components.

Components

Example embodiments may include the above described tiers, and processes or operations about constituting these tiers may be implemented as components. Common to many of these components is the ability to generate, use, and manipulate data. The components, and the functionality associated with each, may form part of standalone, client, server, or peer computer systems. The various components may be implemented by a computer system on an as-needed basis. These components may include software written in an object-oriented computer language such that a component oriented, or object-oriented, programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique.

Software for these components may further enable communicative coupling to other components (e.g., via various APIs), and may be compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, peer-to-peer, or some other suitable configuration. Software for the components may be written using the above described object-oriented programming techniques, and can be written in the same programming language or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Example embodiments may use the OSI model or TCP/IP protocol stack model for defining the protocols used by a network to transmit data. In applying these models, a system of data transmission between a server and client, or between peer computer systems may, for example, include five layers comprising: an application layer, a transport layer, a network layer, a data link layer, and a physical layer. In the case of software, for instantiating or configuring components having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer and the data transmitted over a network such as an Internet, LAN, WAN, or some other suitable network. In some cases, Internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 87 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   storing, at a server computer system, first user profile information for a remote user;
   restricting access to the first user profile information for the remote user at the server computer system, the restricting access to the first user profile information for the remote user at the server computer system comprising using authentication information to encrypt user identification information;
   accessing the first user profile information, at the server computer system, using the authentication information, the authentication information being selectively made available by the remote user via a network to the server computer system in order to enable the server computer system to access the first user profile information; and
   restricting access to the first remote user profile information using the authentication information subsequent to an interaction session between the remote user of the server computer system and removing the authentication information from the server computer system subsequent to the encryption of the first remote user profile information.

2. The method of claim 1, wherein the restricting of the access to the first user profile information at the server computer system further comprises encrypting the first user profile information within a data store accessible by the server computer system.

3. The method of claim 1, wherein the authentication information is received from the remote user at the server computer system and is temporarily stored at the server computer system to enable the access to the first user profile information.

4. The method of claim 3, including removing the authentication information from the server computer system subsequent to the access of the first user profile information using the authentication information.

5. The method of claim 4, wherein the authentication information is removed from the server computer system subsequent to a determinable interaction session by the remote user with the server computer system.

6. The method of claim 3, wherein the receiving the authentication information from the remote user includes receiving the authentication information at the server computer system via the network as a network communication from the remote user, and wherein the authentication information is temporarily stored at the server computer system to enable a hosted application of the server computer system to access the first user profile information.

7. The method of claim 3, wherein the authentication information is stored at a location accessible by the server computer system, and wherein the receiving the authentication information from the remote user includes receiving authorization, via the network and from the remote user, for the server computer system to access the authentication information at the accessible location.

8. The method of claim 7, wherein the receiving the authorization includes receiving a password authorizing access to the authentication information at the accessible location.

9. The method of claim 1, wherein a remote user profile for the remote user includes the first user profile information and second user profile information, and wherein the second user profile information has different access restrictions than the first user profile information.

10. The method of claim 9, wherein access by the server computer system to the second remote user profile information is unrestricted.

11. The method of claim 1, wherein the accessing of the first remote user profile information includes updating the first remote user profile information.

12. The method of claim 11, wherein the first user profile information is updated using remote user activity information determined during an interaction session by the remote user with the server computer system.

13. The method of claim 11, wherein the first user profile information is updated using user-provided information provided by the remote user.

14. The method of claim 1, wherein the accessing of the first remote user profile information includes using the first profile information to customize an interaction by the remote user with a hosted application.

15. The method of claim 1, wherein the accessing includes accessing the first user profile information on an interaction session-by-session basis responsive to the provision of the authentication information to, or withholding of the authentication information from, the server computer system by the remote user.

16. A system comprising:
a data store, accessible by a server computer system, to store first remote user profile information for a remote user; and
an access component of the server computer system to associate the first remote user profile information with identification information of the remote user using a key, the key being selectively made available by the remote user to the access component in order to enable the association of the first remote user profile information with identification information of the remote user,
the access component further to encrypt the first remote user profile information using the key subsequent to an interaction session between the remote user of the server computer system, and to expunge the key from the server computer system subsequent to the encryption of the first remote user profile information.

17. The system of claim 16, including an interface to receive the key at the server computer system from the remote user, and wherein the access component is to temporarily store the key at the server computer system to associate the first remote user profile information with the identification information of the remote user.

18. The system of claim 16, wherein the interface is to receive the key at the server computer system via a network as a network communication from the remote user.

19. The system of claim 16, wherein the access component is to remove the key from the server computer system subsequent to the association of the first remote user profile information with the identification information of the remote user, using the key.

20. The system of claim 19, wherein the access component is to remove the key from the server computer system subsequent to a determinable interaction session by the remote user with the server computer system.

21. The system of claim 16, wherein the data store is to store the key at a location accessible by the server computer system, and wherein the access component is to receive authorization, from the remote user, for the server computer system to access the key at the accessible location.

22. The system of claim 21, wherein the access component is to receive a key password authorizing access to the key at the accessible location.

23. The system of claim 16, wherein a remote user profile for the remote user includes the first remote user profile information and second remote user profile information, and wherein the access component is to enforce different association restrictions with respect to the first and second remote user profile information.

24. The system of claim 23, wherein the access component is to provide unrestricted association by the server computer system of the second remote user profile information with the identification information.

25. The system of claim 16, including an update component, coupled to the access component, to update the first remote user profile information.

26. The system of claim 25, wherein the update component is to update the first remote user profile information using remote user activity information determined during an interaction session by the remote user with the server computer system.

27. The system of claim 25, wherein the update component is to update the first remote user profile information using user-provided information provided by the remote user.

28. The system of claim 16, including a customization component, coupled to the access component, to customize an interaction of the remote user with the server computer system using the first profile information.

29. The system of claim 16, wherein the access component is to access the first remote user profile information on an interaction session-by-session basis responsive to the provision of the key to, or withholding of the key from, the server computer system by the remote user.

30. One or more machine-readable hardware storage device embodying instructions that, when executed by a server computer system, cause the server computer system to perform a method comprising:
storing, at the server computer system, first user profile information for a remote user;
restricting access to the first user profile information for the remote user at the server computer system, the restricting of the access to the first user profile information at the server computer system comprising using authentication information for encrypting remote user identification; and
accessing the first user profile information, at the server computer system, using the authentication information, the authentication information being selectively made available by the remote user via a network to the server computer system in order to enable the server computer system to access the first user profile information; and
restricting access to the first remote user profile information using the authentication information subsequent to an interaction session between the first remote user of the server computer system and removing the authentication information from the server computer system subsequent to the encryption of the first remote user profile information.

31. A method comprising:
- storing, at a server computer system, first user profile information for a remote user;
- restricting access to the first user profile information for the remote user at the server computer system using authentication information, the restricting access to the first user profile information for the remote user at the server computer system comprising encrypting remote user identification information;
- accessing the first user profile information, at the server computer system, using the authentication information, the authentication information being selectively made available by the remote user via a network to the server computer system in order to enable the server computer system to access the first user profile information; and
- restricting access to the first remote user profile information using the authentication information subsequent to an interaction session between the first remote user of the server computer system and removing the authentication information from the server computer system subsequent to the encryption of the first remote user profile information.

32. A method comprising:
- storing, in a first table of a relational database at a server computer system, unrestricted identification information for a remote user;
- storing, in a second table, restricted profile information for the remote user;
- using the unrestricted identification information for the remote user as an index to associate the stored unrestricted identification information with the stored restricted profile information;
- restricting access to the restricted profile information for the remote user at the server computer system using authentication information, the restricting access to the restricted profile information for the remote user at the server computer system comprising encrypting the unrestricted identification information;
- accessing the restricted profile information, at the server computer system, using the authentication information, the authentication information being selectively made available by the remote user via a network to the server computer system in order to enable the server computer system to access the restricted profile information; and
- restricting access to the unrestricted profile information using the authentication information subsequent to an interaction session between the first remote user of the server computer system and removing the authentication information from the server computer system subsequent to the encryption of the unrestricted profile information.

33. A hardware machine-readable storage device having embedded therein a
set of instructions which, when executed by the machine, causes the machine to execute the operations comprising:
- storing in a first table unrestricted identification information for a remote user;
- storing, in a second table, restricted profile information for the remote user;
- using the unrestricted identification information for the remote user as an index to associate the stored unrestricted identification information with the stored restricted profile information;
- restricting access to the restricted profile information for the remote user using authentication information, the restricting access to the restricted profile information for the remote user comprising encrypting the unrestricted identification information for the remote user that associates the restricted profile information with the unrestricted identification information;
- accessing the restricted profile information using the authentication information, the authentication information being selectively made available by the remote user via a network to the server computer system in order to enable the server computer system to access the restricted profile information; and
- restricting access to the unrestricted profile information using the authentication information subsequent to an interaction session between the first remote user of the server computer system and removing the authentication information from the server computer system subsequent to the encryption of the unrestricted profile information.

* * * * *